US012085223B1

(12) United States Patent
Ozkan et al.

(10) Patent No.: US 12,085,223 B1
(45) Date of Patent: Sep. 10, 2024

(54) ADJUSTABLE DISPLAY PANEL RAIL CONNECTOR

(71) Applicant: TRANSFORM PARTNERS LLC, Poway, CA (US)

(72) Inventors: Mehmet Firat Ozkan, San Diego, CA (US); Ozgur Gorur, San Diego, CA (US); Kanat Ilter, San Diego, CA (US)

(73) Assignee: TRANSFORM PARTNERS LLC, Poway, CA (US)

( * ) Notice: Subject to any disclaimer, the term of this patent is extended or adjusted under 35 U.S.C. 154(b) by 0 days.

(21) Appl. No.: 18/495,418

(22) Filed: Oct. 26, 2023

(51) Int. Cl.
| F16M 11/20 | (2006.01) |
| A01K 97/10 | (2006.01) |
| A47B 96/06 | (2006.01) |
| A47F 5/08 | (2006.01) |
| F16M 13/02 | (2006.01) |
| A47B 81/00 | (2006.01) |

(52) U.S. Cl.
CPC ......... *F16M 11/2092* (2013.01); *A01K 97/10* (2013.01); *A47B 96/063* (2013.01); *A47F 5/0838* (2013.01); *F16M 13/022* (2013.01); *A47B 81/005* (2013.01); *A47F 5/08* (2013.01); *A47F 5/0846* (2013.01)

(58) Field of Classification Search
CPC . F16M 11/2092; F16M 13/022; A47F 5/0838; A47F 5/0853; A47F 5/0846; A47F 5/08; A47F 5/0807; A47F 5/0815; A47F 5/0876; A47F 7/0021; A47F 7/0028; A47B 96/067; A47B 81/005; A47B 96/06; A47B 96/063; A47B 96/068; A47B 96/14; A01K 97/08; A01K 97/10

USPC ........................................ 211/1, 94.01, 162
See application file for complete search history.

(56) References Cited

U.S. PATENT DOCUMENTS

| 4,018,019 A | * | 4/1977 | Raith | A47B 57/404 52/36.6 |
| 4,988,007 A | * | 1/1991 | Chiarot | A63C 11/028 D6/552 |
| 5,054,627 A | * | 10/1991 | Gregory | A47F 1/12 206/338 |
| 5,224,610 A | * | 7/1993 | Veazey | G09F 7/10 211/162 |

(Continued)

*Primary Examiner* — Devin K Barnett
(74) *Attorney, Agent, or Firm* — Knobbe Martens Olson & Bear LLP

(57) ABSTRACT

An adjustable connector for connecting a display panel to a rail is described. The adjustable connector includes a rail-coupling bracket and a display-coupling bracket. An upper adjustment carriage is positioned between the rail-coupling bracket and the display-coupling bracket at an upper end portion, and a lower adjustment carriage is positioned between the rail-coupling bracket and the display-coupling bracket at a lower end portion. An upper pin extends through a horizontal slot in the display-connecting bracket, an inclined slot in the upper adjustment carriage, and an opening in the display-connecting bracket. Rotating an upper hand-turnable knob adjusts a depth of the upper end portion of the display-coupling bracket relative to the rail-coupling bracket. A similar lower adjustment carriage and lower hand-turnable knob provides similar adjustment at the lower end portion. In some instances, the adjustable connector provides up to 15 mm of depth control to compensate for uneven wall surfaces.

20 Claims, 6 Drawing Sheets

(56) References Cited

U.S. PATENT DOCUMENTS

| | | | | |
|---|---|---|---|---|
| 5,549,379 A * | 8/1996 | Jun | A47B 46/00 | 312/246 |
| 5,740,927 A * | 4/1998 | Yemini | A47F 5/0853 | 211/94.01 |
| 6,119,878 A * | 9/2000 | Zen | A47F 5/0846 | 248/222.51 |
| 6,971,614 B2 * | 12/2005 | Fischer | A47F 5/0846 | 248/222.51 |
| 8,087,521 B2 * | 1/2012 | Schwartzkopf | A47F 5/101 | 211/94.01 |
| 8,434,629 B2 * | 5/2013 | Fernandez | A47B 96/067 | 211/94.01 |
| 8,998,009 B2 * | 4/2015 | Kim | A47B 96/067 | 211/175 |
| 9,763,515 B2 * | 9/2017 | Fratilla | A47B 73/00 | |
| 10,342,346 B2 * | 7/2019 | Hansen | A47B 96/067 | |
| 12,017,719 B1 * | 6/2024 | Downham | B65D 81/05 | |
| 2004/0124164 A1 * | 7/2004 | Perkins | A47B 95/008 | 211/94.01 |
| 2006/0175274 A1 * | 8/2006 | Yang | A47F 5/0838 | 211/187 |
| 2007/0023375 A1 * | 2/2007 | Fedewa | F16M 11/046 | 211/102 |
| 2007/0056921 A1 * | 3/2007 | Lo | F16M 11/046 | 211/94.01 |
| 2008/0105636 A1 * | 5/2008 | Lawson | A47F 5/0846 | 211/94.01 |
| 2008/0237426 A1 * | 10/2008 | Walters | H04N 5/64 | 248/304 |
| 2012/0298819 A1 * | 11/2012 | Begic | F16M 13/02 | 248/225.11 |
| 2014/0308838 A1 * | 10/2014 | Kuo | H01R 13/6395 | 439/347 |
| 2015/0250334 A1 * | 9/2015 | Lung | A47F 5/0853 | 211/94.01 |

* cited by examiner

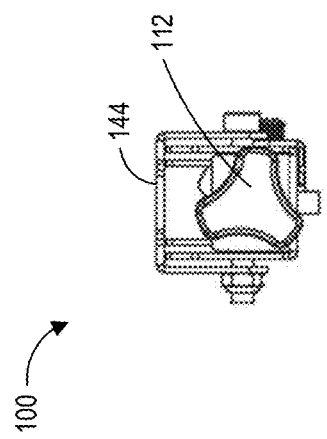
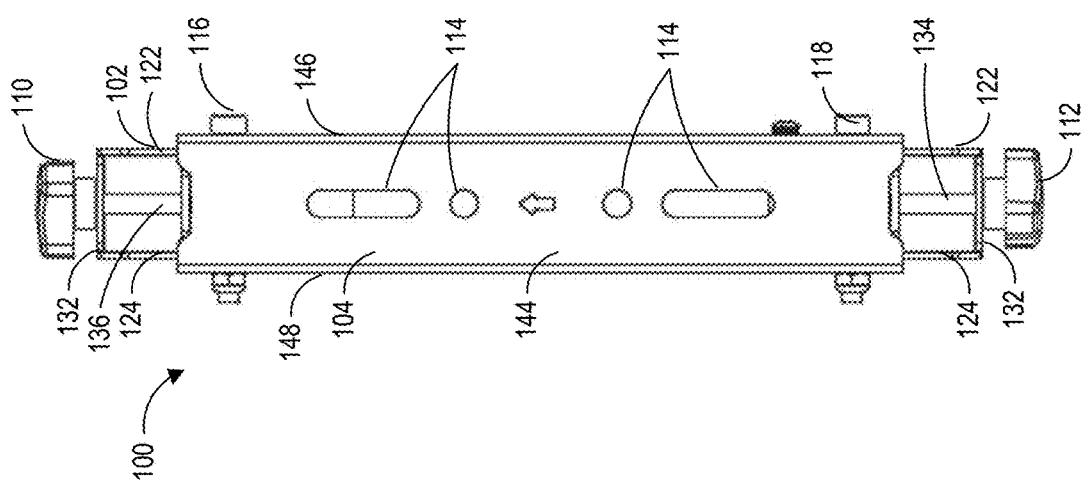

ADJUSTABLE DISPLAY PANEL RAIL CONNECTOR

BACKGROUND

Field

This application relates to a connector for connecting a display panel, such as an LED display panel, to a rail in order to mount the display panel to a wall or other surface. More specifically, this application relates to an adjustable display panel rail connector.

Description

Display panels, such as television screens, computer monitors, and the like, are available in a wide variety of technologies, including LED (light emitting diode), LCD (liquid crystal display), OLED (organic LED), QLED (quantum dot LED), plasma, and others. Display panels are available in a variety of sizes suitable for various applications, from home to commercial use.

In some instances, it is desirable to mount a display panel to a wall or other surface. Various display panel mounts are available for this purpose. Some of these mounts are configured to allow various positional adjustments for the display panel relative to the wall, including depth adjustments, horizontal tilt adjustments, vertical tilt adjustments, and rotational adjustments.

Further, it can be desirable to mount a plurality of display panels in an array or matrix, such that the individual display panels together make up a larger display panel wall. Such larger display panel walls are often installed in commercial settings for display of informational, recreational, or decorative content. Some large display panel walls use Direct View LED displays, which do not require an LCD panel, and instead use a surface array of LEDs as the actual display pixels. On larger display panel walls, it can be desirable to minimize the distance between adjacent individual display panels, as well as to level adjacent display panels, so as to provide a clean and efficient appearance.

SUMMARY

An adjustable connector for connecting a display panel to a rail is described herein. The adjustable connector includes a rail-coupling bracket and a display-coupling bracket. An upper adjustment carriage is positioned between the rail-coupling bracket and the display-coupling bracket at an upper end portion, and a lower adjustment carriage is positioned between the rail-coupling bracket and the display-coupling bracket at a lower end portion. An upper pin extends through a horizontal slot in the display-connecting bracket, an inclined slot in the upper adjustment carriage, and an opening in the display-connecting bracket. Rotating an upper hand-turnable knob causes movement of the upper adjustment carriage, which causes a provides a depth adjustment for the upper end portion of the display-coupling bracket relative to the rail-coupling bracket. A similar lower adjustment carriage and lower hand-turnable knob provides similar adjustment at the lower end portion.

In some embodiments, the adjustable connector is made primarily from metal (e.g., steel) and includes hand-turnable adjustment knobs, which can be made from plastic (e.g., nylon). The adjustable connector can provide a range of depth adjustment of, for example, between 0-15.24 mm. The adjustable connector can provide a range of angle adjustment of, for example, +/−1.5 degrees. In some instances, the adjustable connector or a plurality of adjustable connectors can be configured to provide for alignment of video display surfaces by compensating for uneven walls or other mounting surfaces. Further, use of hand-turnable adjustment knobs simplifies the process of aligning video displays by eliminating the need for tools.

In one aspect, an adjustable connector for connecting a display panel to a rail includes a rail-coupling bracket, a display-coupling bracket, an upper adjustment carriage, a lower adjustment carriage, and upper adjustment knob, and a lower adjustment knob.

The rail-coupling bracket extends generally along a first axis between an upper end portion and a lower end portion. The rail-coupling bracket can include a back surface, a left surface, and a right surface, which together define an opening configured to receive a rail, wherein each of the left surface and the right surface further comprise an upper horizontal slot on the upper end portion and a lower horizontal slot on the lower end portion, wherein the upper slots and the lower slots extend along a direction that is perpendicular to the first axis, and an upper surface on the upper end portion and a lower surface on the lower end portion.

The display-coupling bracket generally extends along the first axis. The display-coupling bracket can include a front surface comprising one or more openings for securing a display panel to the front surface of the display-coupling bracket, and a left surface and a right surface, each projecting from lateral sides of the front surface in a direction towards the rail-coupling bracket, wherein the left surface and the right surface of the display-coupling bracket extend over outer sides of the left surface and the right surface of the rail-coupling bracket, and wherein the left surface and the right surface each comprise an upper opening and a lower opening that are aligned with the upper slot and the lower slot of the rail-coupling bracket.

The upper adjustment carriage is positioned at the upper end portion of the rail-coupling bracket between the rail-coupling bracket and the display-coupling bracket. The upper adjustment carriage can include a back surface, a left surface, a right surface, and an upper surface, wherein the left surface and the right surface are received between the left surface and the right surface of the rail-coupling bracket, the left surface and the right surface each comprising an upper inclined slot, wherein at least a portion of the upper inclined slots is aligned with the upper slots of the rail-coupling bracket and the upper openings of the display-coupling bracket, and an upper pin extending through the upper openings of the display-coupling bracket, the upper inclined slots of the upper adjustment carriage, and the upper slots of the rail-coupling bracket.

The upper adjustment knob can comprise a hand-turnable knob and a shaft extending from the hand-turnable knob along the first axis, the shaft extending through an opening on the upper surface of the rail-coupling bracket and threadably engaged with a threaded aperture formed on the upper adjustment carriage such that rotating the upper adjustment knob causes the upper adjustment carriage to move up and down along the first axis thereby causing the upper pin to travel along the upper slot of the rail-coupling bracket and the upper inclined slot of the upper adjustment carriage to cause an upper portion of the display-coupling bracket to move in a direction perpendicular to the first axis.

The lower adjustment carriage is positioned at the lower end portion of the rail-coupling bracket between the rail-coupling bracket and the display-coupling bracket. The lower adjustment carriage can include a back surface, a left surface, a right surface, and an lower surface, wherein the left surface and the right surface are received between the left surface and the right surface of the rail-coupling bracket, and the left surface and the right surface each comprising a lower inclined slot, wherein at least a portion of the lower inclined slots is aligned with the lower slots of the rail-coupling bracket and the lower openings of the display-coupling bracket.

The lower adjustment knob can include a hand-turnable knob and a shaft extending from the hand-turnable knob along the first axis, the shaft extending through an opening on the lower surface of the rail-coupling bracket and threadably engaged with a threaded aperture formed on the lower adjustment carriage such that rotating the lower adjustment knob causes the lower adjustment carriage to move up and down along the first axis thereby causing the lower pin to travel along the lower slot of the rail-coupling bracket and the lower inclined slot of the upper adjustment carriage to cause a lower portion of the display-coupling bracket to move in a direction perpendicular to the first axis.

In some embodiments, the adjustable connector can include one or more of the following features in any combination: (a) wherein the upper inclined slots of the upper adjustment carriage are formed at a 45 degree angle with respect to the upper slots of the rail-coupling bracket and the first axis; (b) wherein the lower inclined slots of the lower adjustment carriage are formed at a 45 degree angle with respect to the lower slots of the rail-coupling bracket and the first axis; (c) wherein the upper inclined slots and the lower inclined slots are angled in opposite directions; (d) wherein rotating the upper adjustment knob and the lower adjustment knob provides at least 15 mm of displacement for the display-coupling bracket relative to the rail-coupling bracket; (c) wherein rotating the upper adjustment knob and the lower adjustment knob provides at least 1.5 degrees of tilt adjustment for the display-coupling bracket relative to the rail-coupling bracket; (f) wherein a depth of the adjustable connector when fully retracted measured between the back surface of the rail-coupling bracket and the front surface of the display-coupling bracket is about 41 mm; (g) wherein a width of the adjustable connector measured between the left surface and the right surface of the display-coupling bracket is about 41 mm; (h) wherein the left and right surfaces of the upper adjustment carriage and the left and right surfaces of the lower adjustment carriage contact inner sides of the left and right surfaces of the rail-coupling bracket; (i) wherein the left and right surfaces of display-coupling bracket contact outer sides of the left and right surfaces of the rail-coupling bracket; (j) wherein the rail-coupling bracket, the display-coupling bracket, the upper adjustment carriage, and the lower adjustment carriage comprise steel; (k) wherein the hand-turnable knobs of the upper adjustment knob and the lower adjustment knob comprise plastic; and/or (l) wherein the adjustable connector is configured for toolless adjustment.

In another aspect a system can include a rail and one or more adjustable connectors as described above and herein. The adjustable connector(s) can be mounted on the rail. In some embodiments, the rail comprises a slotted rail. In some embodiments, the adjustable connector(s) comprises a locking tab for securing the first adjustable connector to the rail.

BRIEF DESCRIPTION OF THE DRAWINGS

The features and advantages of the systems, devices, and methods described herein will become apparent from the following description, taken in conjunction with the accompanying drawings. These drawings depict an embodiment in accordance with the disclosure and are not to be considered limiting of its scope. In the drawings, similar reference numbers or symbols typically identify similar components, unless context dictates otherwise. The drawings may not be drawn to scale.

FIG. 2 is a front view of the adjustable connector of FIG. 1.

FIG. 3 is a bottom view of the adjustable connector of FIG. 1, with a top view being similar.

DETAILED DESCRIPTION

Figure 1:
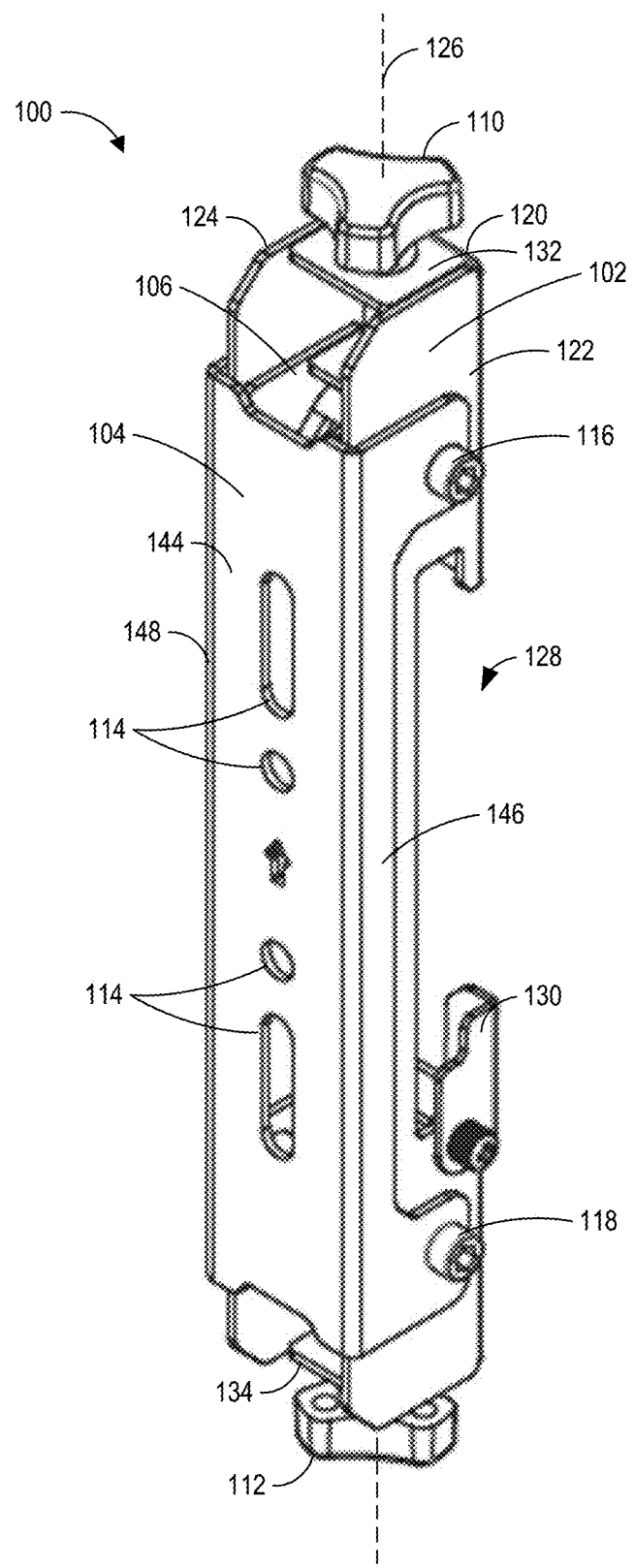
FIG. 1 is a front isometric view of an embodiment of an adjustable connector for connecting a display panel to a rail.

This application describes an adjustable connector for connecting a display panel to a rail. The adjustable connector is configured such that a depth of the display panel mounted on the adjustable connector (e.g., the distance between the display panel and the rail) and/or a vertical tilt angle of the display panel can be adjusted. Further, the adjustable connector is configured such that adjustments can be made by hand, without requiring tools. For example, the adjustable connector can include one or more knobs, which can be rotated by hand, in order to control the adjustments.

The adjustable connector can be configured for use with a wide variety of display panel technologies, including LED (light emitting diode), LCD (liquid crystal display), OLED (organic LED), QLED (quantum dot LED), plasma, and others. In some instances, the adjustable connector (or a plurality of the adjustable connectors) can be used with a plurality of display panels to create a display panel wall, wherein the display panel wall comprises multiple display panels positioned linearly (e.g., along a vertical or horizontal axis) or in a grid. For display panel walls comprising a plurality of individual display panels, it can be important to mount the individual display panels such that they are flush with one another to provide the display panel wall with a clean and uniform appearance. However, imperfections and variations in the wall or other surface or structure to which the display panel wall is mounted, may make flush mounting of the individual display panels difficult. By using the adjustable connectors described herein, each individual display panel can be adjusted as needed so as to be mounted flushly with the other display panels of the display panel wall.

As one example, the adjustable connector described herein can be configured for use with audiovisual installations that direct-view LED panels to create a video wall. A direct-view LED panel, often referred to simply as an LED display or LED screen, is a display technology that uses light-emitting diodes (LEDs) to create images and visuals. Unlike traditional LCD or OLED displays, where the pixels are made up of individual cells that emit or block light, a direct-view LED panel consists of an array of tiny LED clusters that emit light directly. This design allows for bright and vibrant visuals with excellent contrast and color accuracy. Direct-view LED panels are commonly used for large-scale displays, including outdoor billboards, indoor displays, video walls, digital signage, and entertainment. In each case, use of the adjustable connector as described herein can improve the display by helping to provide flush and even mounting of the individual display panels.

In some embodiments, the adjustable connector described herein has an advantageously small design, which minimizes the total thickness of the adjustable connector (e.g., in the depth direction) while also permitting sufficient adjustability to achieve good results. For example, in one embodiment, the adjustable connector comprises a thickness (in the depth direction) of only 41 mm (when fully retracted) and further provides for about 15 mm of extension and adjustment (e.g., a maximum thickness of 56 mm when fully extended). Further, the top and bottom portions of the adjustable connector can be adjusted separately, providing for an adjustment for vertical tilt. In some embodiments, 1.5 degrees of vertical tilt adjustment is provided. By adjusting the extension of two adjacently positioned adjustable connectors, horizontal tilt adjustment of a display panel can also be provided.

As noted previously, adjustment of the adjustable connector is made via hand-turnable knobs, which allows for simple adjustment without requiring the use of tools. In some embodiments, the adjustable connector comprises steel, while the adjustment knobs comprise plastic (e.g., nylon).

The adjustable connector is configured to be used in conjunction with display panels and display panel walls mounted to walls, surfaces, ceiling mounts, and floor stands to eliminate the problems associated with imperfect walls and other mounting surfaces. Imperfect mounting surfaces can cause the viewable surface of the display panels to have visible distortions, resulting in an undesirable viewing experience.

These and other features of the adjustable connector described herein will become more fully apparent from the following description of specific embodiment illustrated in the figures. This embodiment is intended to illustrate the principles of this disclosure, and this disclosure should not be limited to merely the illustrated example. The features of illustrated embodiment can be modified, combined, removed, and/or substituted as will be apparent to those of ordinary skill in the art upon consideration of the principles taught in this disclosure.

Figure 5:
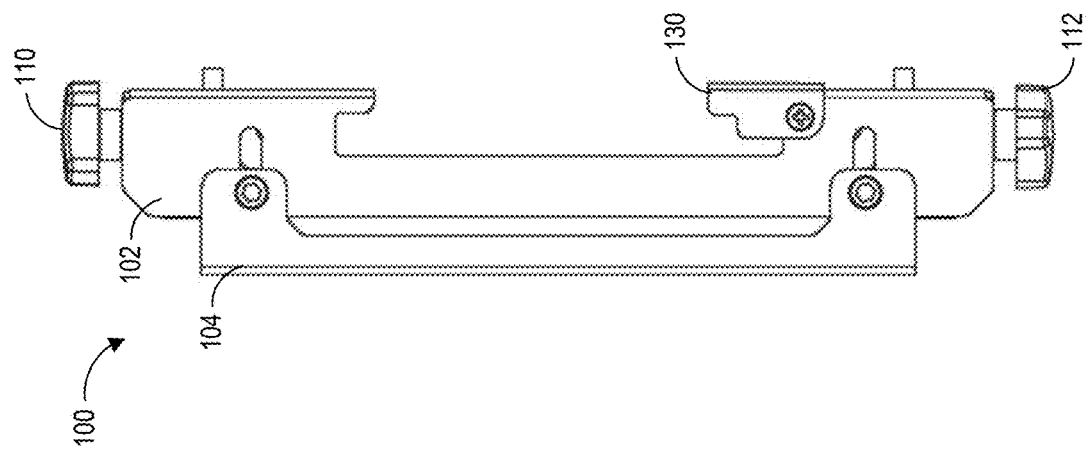
FIG. 5 is a second side view of the adjustable connector of FIG. 1, shown in an extended state.
Figure 4:
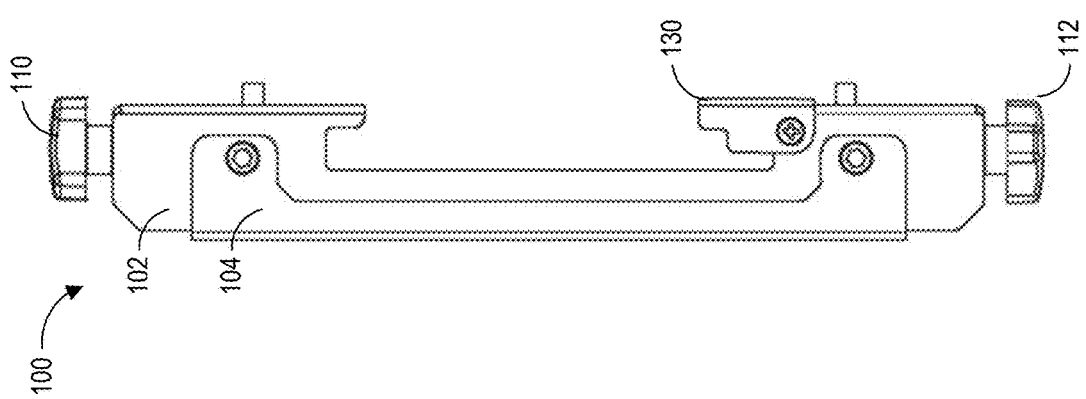
FIG. 4 is a first side view of the adjustable connector of FIG. 1, shown in a retracted state.

FIGS. 1-5 illustrate various views of an embodiment of an adjustable connector 100 for connecting a display panel to a rail. FIG. 1 is a front isometric view, FIG. 2 is a front view, and FIG. 3 is a bottom view (with a top view being similar). FIGS. 4 and 5 are first and second side views of the adjustable connector 100, illustrating example adjustability thereof. For example, FIG. 4 is a first side view of the adjustable connector 100, shown in a retracted state, and FIG. 5 is a second side view of the adjustable connector 100, shown in an extended state.

Figure 6:
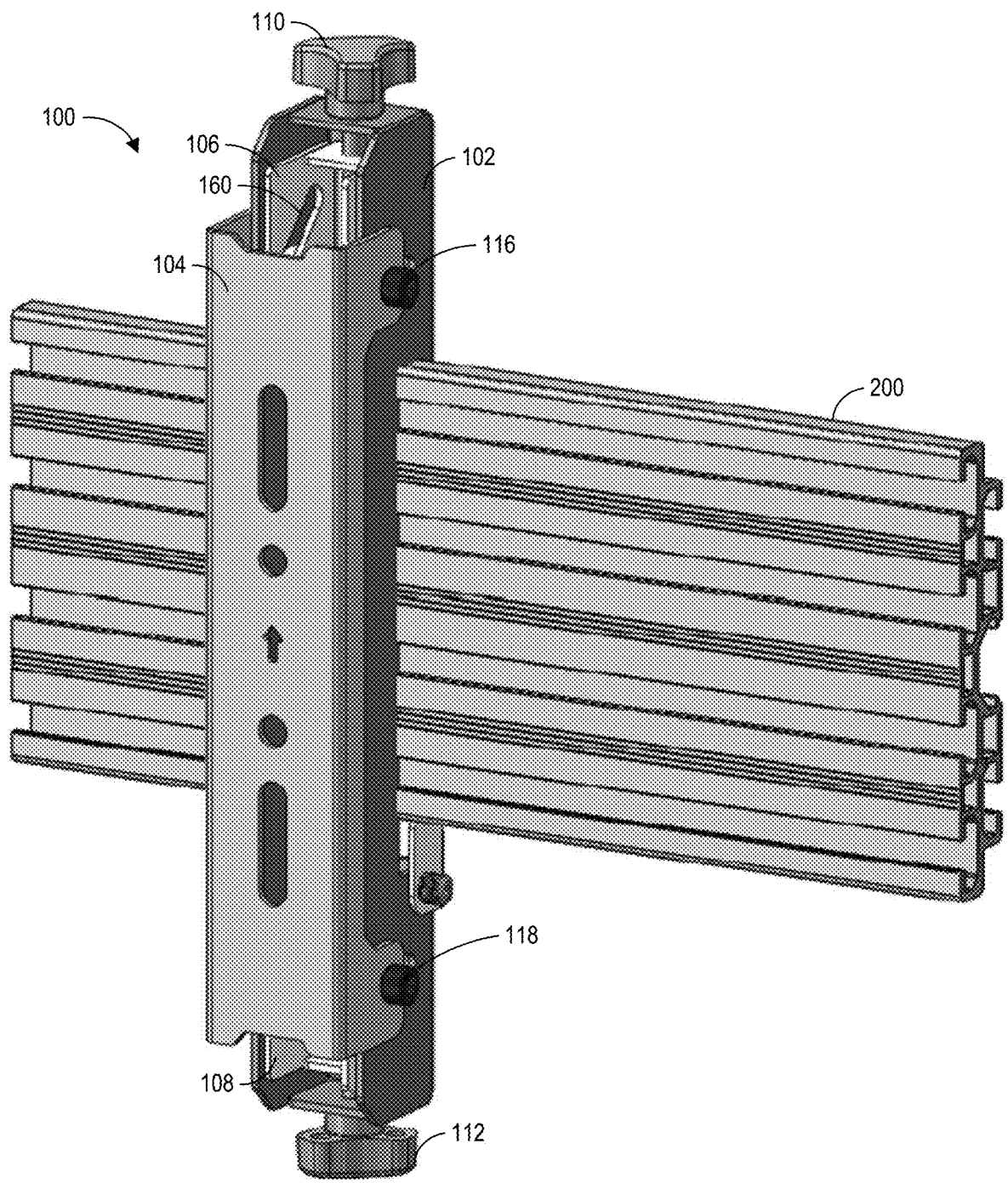
FIG. 6 is an isometric view of the adjustable connector of FIG. 1 mounted on a rail.
Figure 7:
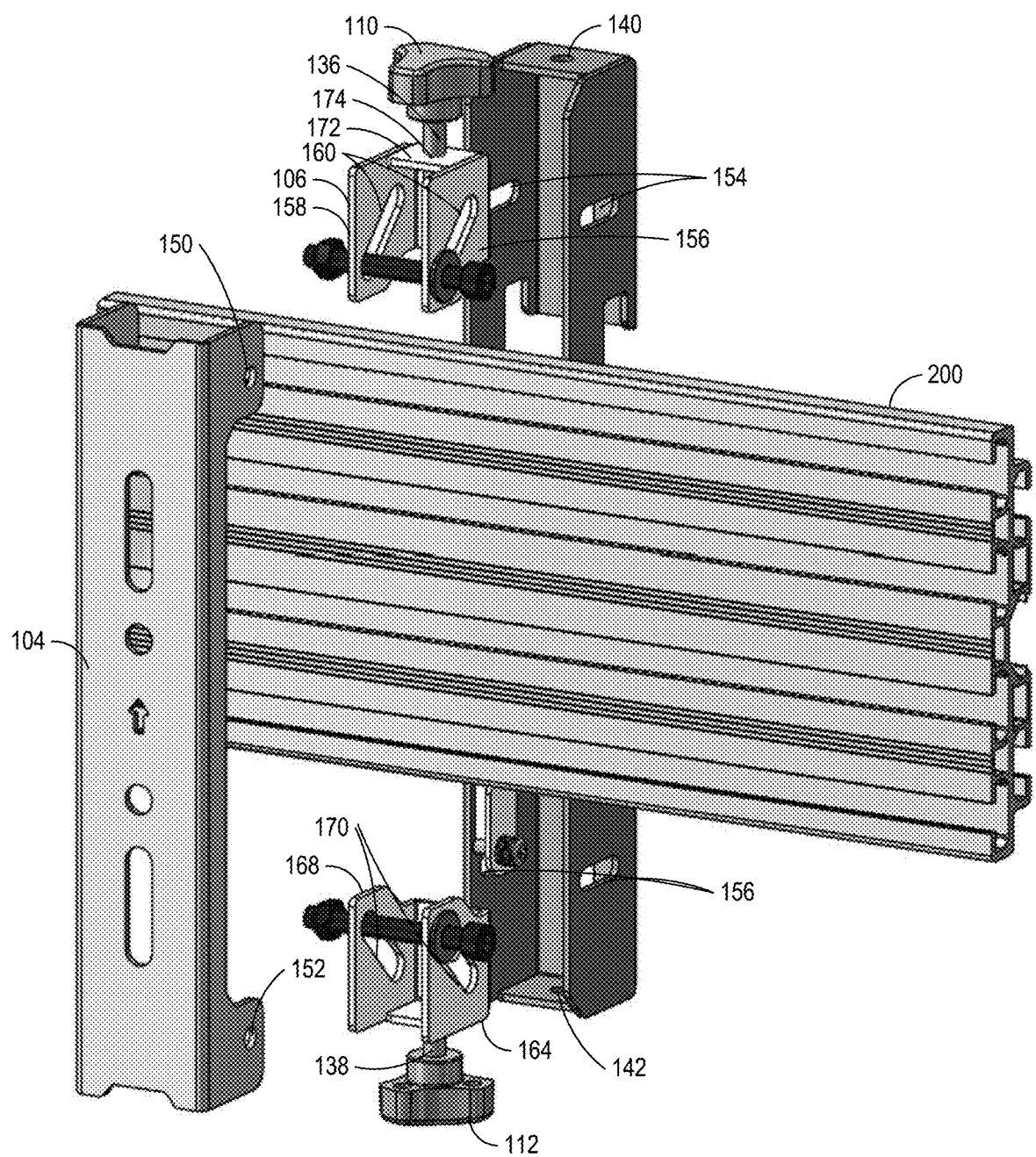
FIG. 7 is an exploded isometric view of the adjustable connector of FIG. 1 and a rail.
Figure 9:
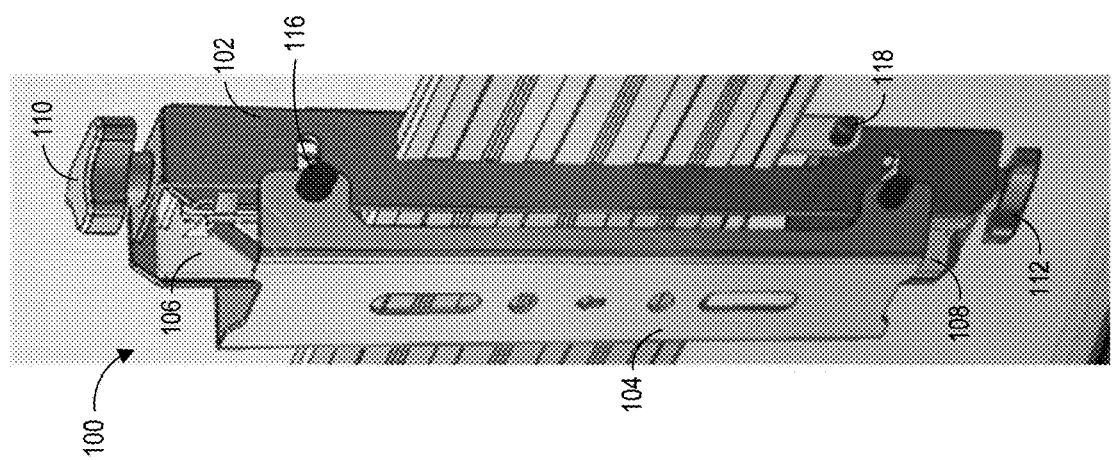
FIG. 9 is a second perspective view of the adjustable connector of FIG. 1 mounted on a rail and shown in an extended state.
Figure 8:
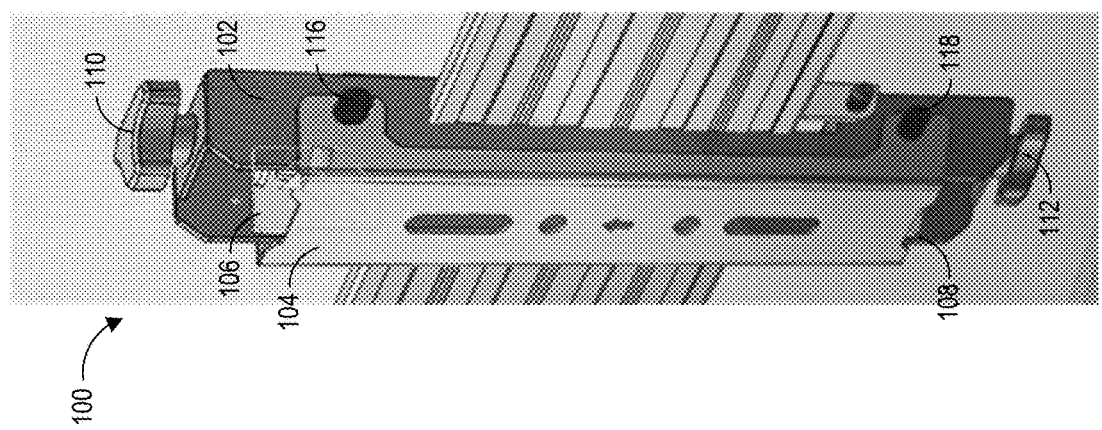
FIG. 8 is a first perspective view of the adjustable connector of FIG. 1 mounted on a rail and shown in in a retracted state.

FIGS. 6-9 illustrate various views of the adjustable connector 100 of FIGS. 1-5, shown in relation to a rail 200. In particular, FIG. 6 is an isometric view of the adjustable connector 100 mounted on the rail 200, and FIG. 8 is an exploded isometric view of the adjustable connector 100 and the rail 200. Further, FIGS. 8 and 9 illustrate example adjustability of the adjustable connector 100 relative to the rail 200. FIG. 8 is a first perspective view of the adjustable connector 100 mounted on the rail 200 and shown in in a retracted state, and FIG. 9 is a second perspective view of the adjustable connector of 100 mounted on the rail 200 and shown in an extended state.

With reference to FIGS. 1-9, the adjustable connector 100 comprises a rail-coupling bracket 102, a display-coupling bracket 104, an upper adjustment carriage 106, a lower adjustment carriage 108, an upper adjustment knob 110, and a lower adjustment knob 112. The rail-coupling bracket 102 is configured to mount or couple to a rail 200, for example, as shown in FIGS. 6-9. The rail 200 can be coupled to a wall, other surface, support stand, etc. The display-coupling bracket 104 is configured to couple to a display panel (not shown). For example, as shown in FIG. 1, the display-coupling bracket 104 comprises one or more openings or apertures 114 that can be used to couple or mount a display panel to the display-coupling bracket 104. The openings or apertures of the display-coupling bracket 104 can be configured in size, shape, and position to correspond to similar openings on a rear portion of a display panel or display panel cabinet. Fasteners, such as bolts or screws, can extend through the openings or apertures 114 to couple the display panel to the display-coupling bracket 104.

The display-coupling bracket 104 and the rail-coupling bracket 102 are connected to each other using an upper pin 116 and a lower pin 118. The upper and lower pins 116, 118, also pass through the upper and lower adjustment carriages 106, 108, thereby coupling the rail-coupling bracket 102, the display-coupling bracket 104, the upper adjustment carriage 106, the lower adjustment carriage 108 together. As will be described in more detail below, the upper and lower pins 116, 118 and the upper and lower adjustment carriages 106, 108 are configured to facilitate relative motion between the display-coupling bracket 104 and the rail-coupling bracket 104. In particular, and as will be describe more fully below, the upper and lower pins 116, 118 and the upper and lower adjustment carriages 106, 108 allow for the depth of the display-coupling bracket 104 to be adjusted relative to the rail-coupling bracket 102 by turning the upper and lower knobs 110, 112.

The rail-coupling bracket 102 comprises a rear surface 120, a left surface 122, and a right surface 124. The rear surface 120, the left surface 122, and the right surface 124 are arranged in a general U-shape with the left surface 122 and the right surface 124 extending from lateral edges of the rear surface 102. In general, the rail-coupling bracket 102 extends along an axis 126. During use, the axis 126 may be a generally vertical axis, although this need not be the case in all embodiments, and the adjustable connector 100 can be used at different orientations. Directional language used in this application is generally provided with respect to this orientation and/or the orientation shown in the figure. Still, this directional language is provided by way of example and illustration and should not be construed as limiting.

The rear surface 120, the left surface 122, and the right surface 124 are configured with a shape for coupling the rail-coupling bracket 102 to the rail 200. For example, as shown in FIG. 1, the rear surface 120, the left surface 122, and the right surface 124 comprise a shape that defines an opening or profile that generally corresponds to the profile of the rail 200, such that the rail-coupling bracket 102 can be positioned on the rail 200 as shown in FIGS. 6-9. In the illustrated embodiment, the rail-coupling bracket also includes a locking tab 130 which can be used to further secure the rail-coupling bracket to the rail 200.

As best shown in FIG. 7, the left and right surfaces 122, 124 of the rail-coupling bracket 102 include upper and lower slots 154, 156. The upper and lower pins 116, 118 extend through the upper and lower slots 154, 156. The upper and lower slots 154, 156 are configured in size to allow the upper and lower pins 116, 118 to travel along the upper and lower slots 154, 156. As shown in FIG. 7, the upper and lower slots 154, 156 extend in a direction that is perpendicular to the axis 126. In the figure, this is a horizontal direction.

With continued reference to the figures, the rail-coupling bracket 102 further includes upper and lower surfaces 132, 134. These upper and lower surfaces 132, 134 can be configured to receive a shaft 136 of the upper knob 110 and a shaft 138 of the lower knob 112. The shafts 136, 138 can pass through openings on the upper and lower surfaces 132, 134. The shafts 136, 138 and the openings 140, 142 that are configured in size and shape to allow the shafts 136, 138 to rotate relative to the openings 140, 142. In this way, the rotatable knobs 110, 112, are secured to the upper and lower surfaces 132 134 of the rail-coupling bracket 102.

The display-coupling bracket 104 comprises a front surface 144, a left surface 146, and a right surface 148. The front surface 144, the left surface 146, and the right surface 148 are arranged in a general U-shape with the left surface 146 and the right surface 148 extending from lateral edges of the front surface 144. In general, the display-coupling bracket 104 extends along an axis 126. As shown in FIGS. 1 and 3, the left surface 146 and the right surface 148 of the display-coupling bracket are positioned on outer sides of the left surface 122 and the right surface 124 of the rail-coupling bracket 102. In some embodiments, these sides contact each other. In some embodiments, the sides are spaced apart.

As best shown in FIG. 7, the left and right surfaces 146, 148 of the display-coupling bracket 104 include upper and lower openings 150, 152. The upper and lower openings 150, 152 are configured to receive the upper and lower pins 116, 118.

With continued reference to FIG. 7, the upper adjustment carriage 106 will now be described. The upper adjustment carriage includes a back surface 154, a left surface 156, and a right surface 158. The rear surface 154, the left surface 156, and the right surface 158 are arranged in a general U-shape with the left surface 156 and the right surface 158 extending from lateral edges of the rear surface 154. When assembled, the upper adjustment carriage 106 is received at least partially within the U-shape of the display-coupling bracket, for example, such that the left surface 156 and the right surface 158 are positioned on inner sides of the left surface 122 and the right surface 124 of the rail-coupling bracket 102.

As shown in FIG. 7, each of the that the left surface 156 and the right surface 158 of the upper adjustment carriage 106 includes an angled slot 160. The angled slot 160 can be configured to receive the upper pin 116. The angled slots 160 are configured in size to allow the upper pin 116 to travel along the angled slot 160. As shown in FIG. 7, the angled slot 160 extends in a direction that is at a 45-degree angle with respect to the axis 126 and the upper slots 154 of the rail-coupling bracket 102. Other angles can also be used.

The upper adjustment carriage 106 further includes an upper surface 172 that includes a threaded aperture 174. The threaded aperture 174 receives a threaded portion of the upper shaft 136 connected to the upper knob 110. In this way, rotation of the upper knob 110 causes the upper adjustment carriage 106 travel up and down along the upper shaft 136.

With continued reference to FIG. 7, the lower adjustment carriage 108 will now be described. The lower adjustment carriage includes a back surface 162, a left surface 164, and a right surface 168. The rear surface 162, the left surface 164, and the right surface 166 are arranged in a general U-shape with the left surface 164 and the right surface 166 extending from lateral edges of the rear surface 162. When assembled, the lower adjustment carriage 108 is received at least partially within the U-shape of the rail-coupling bracket 102, for example, such that the left surface 164 and the right surface 166 are positioned on inner sides of the left surface 122 and the right surface 124 of the rail-coupling bracket 102.

As shown in FIG. 7, each of the that the left surface 164 and the right surface 166 of the lower adjustment carriage 108 includes an angled slot 170. The angled slot 170 can be configured to receive the lower pin 118. The angled slots 170 are configured in size to allow the lower pin 118 to travel along the angled slot 170. As shown in FIG. 7, the angled slot 170 extends in a direction that is at a 45-degree angle with respect to the axis 126 and the lower slots 156 of the display-coupling bracket 102. Other angles can also be used.

The lower adjustment carriage 180 further includes a lower surface 176 that includes a threaded aperture 178. The threaded aperture 178 receives a threaded portion of the lower shaft 138 connected to the lower knob 112. In this way, rotation of the lower knob 112 causes the lower adjustment carriage 108 travel up and down along the lower shaft 138.

As noted previously, the adjustable connector 100 is configured to allow for depth adjustment and tilt adjustment of the display-coupling bracket 104 relative to the rail-coupling bracket 102. Adjustment is accomplished by rotating the upper knob 110 and/or the lower knob 112. Rotating the upper knob 110 causes adjustment of an upper portion of the display-coupling bracket 104. Rotating the lower knob 112 causes adjustment of a lower portion of the display-coupling bracket 104. Tilt adjustment is achieved by adjusting the upper and lower portions of the display-coupling bracket 104 to different positions.

Example depth adjustment can be seen in FIGS. 4 and 5. FIG. 4 shows the adjustable connector 100 with the upper and lower portions of the display-coupling bracket 104 fully retracted relative to the rail-coupling bracket 102, while FIG. 5 shows the adjustable connector 100 with the upper and lower portions of the display-coupling bracket 104 fully extended relative to the rail-coupling bracket 102. In some embodiments, this depth adjustment (measured along an axis perpendicular to the axis 126) is about 15 mm, although other distances are possible. Further, by adjusting either the top portion or the bottom portion of adjustable connector 100, tilt of the display-coupling bracket can be achieved. In some embodiments, up to +/−1.5 degrees of tilt adjustment is possible.

Adjustment occurs as follows. For adjustment of the upper portion, the upper knob 110 is rotated. This causes the upper adjustment carriage 106 to travel up or down along the shaft 136. The upper pin 116 engaged with the upper slot 156 of the rail-connecting portion 102 and the inclined slot 160 of the upper adjustment carriage 106 travels along each slot. This causes the display-connecting bracket 104 to move outwardly. For adjustment of the lower portion, the upper knob 112 is rotated. This causes the lower adjustment carriage 108 to travel up or down along the shaft 138. The lower pin 118 engaged with the lower slot 158 of the rail-connecting portion 102 and the inclined slot 170 of the upper adjustment carriage 108 travels along each slot. This causes the display-connecting bracket 104 to move outwardly. Sec, for example, FIGS. 8 and 9.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures can be combined, interchanged or excluded from other embodiments.

The above description discloses several methods and materials of the present inventions. The inventions are susceptible to modifications in the methods and materials, as well as alterations in the fabrication methods and equipment. Such modifications will become apparent to those skilled in the art from a consideration of this disclosure or practice of the inventions disclosed herein. Consequently, it is not intended that the inventions be limited to the specific embodiments disclosed herein, but that it cover all modifications and alternatives coming within the true scope and spirit of the inventions as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties can be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. An adjustable connector for connecting a display panel to a rail, the adjustable connector comprising:
   a rail-coupling bracket extending generally along a first axis between an upper end portion and a lower end portion, the rail-coupling bracket comprising:
      a back surface, a left surface, and a right surface, which together define an opening configured to receive a rail, wherein each of the left surface and the right surface further comprise an upper horizontal slot on the upper end portion and a lower horizontal slot on the lower end portion, wherein the upper slots and the lower slots extend along a direction that is perpendicular to the first axis, and
      an upper surface on the upper end portion and a lower surface on the lower end portion;
   a display-coupling bracket generally extending along the first axis, the display-coupling bracket comprising:
      a front surface comprising one or more openings for securing a display panel to the front surface of the display-coupling bracket, and
      a left surface and a right surface, each projecting from lateral sides of the front surface in a direction towards the rail-coupling bracket, wherein the left surface of the display-coupling bracket and the right surface of the display-coupling bracket extend over outer sides of the left surface of the rail-coupling bracket and the right surface of the rail-coupling bracket, and wherein the left surface of the display-coupling bracket and the right surface of the display-coupling bracket each comprise an upper opening and a lower opening that are aligned with the upper slot and the lower slot of the rail-coupling bracket;
   an upper adjustment carriage positioned at the upper end portion of the rail-coupling bracket between the rail-coupling bracket and the display-coupling bracket, the upper adjustment carriage comprising:
      a back surface, a left surface, a right surface, and an upper surface, wherein the left surface of the upper adjustment carriage and the right surface of the upper adjustment carriage are received between the left surface of the rail-coupling bracket and the right surface of the rail-coupling bracket,
      the left surface of the upper adjustment carriage and the right surface of the upper adjustment carriage each comprising an upper inclined slot, wherein at least a portion of the upper inclined slots is aligned with the upper slots of the rail-coupling bracket and the upper openings of the display-coupling bracket, and
      an upper pin that extends through the upper openings of the display-coupling bracket, the upper inclined slots of the upper adjustment carriage, and the upper slots of the rail-coupling bracket;
   an upper adjustment knob, wherein the upper adjustment knob is a hand-turnable knob and a shaft extends from the hand-turnable knob along the first axis, the shaft extends through an opening on the upper surface of the rail-coupling bracket and is threadably engaged with a threaded aperture formed on the upper adjustment carriage, wherein the upper adjustment knob is configured to rotate to cause the upper adjustment carriage to move up and down along the first axis thereby causing the upper pin to travel along the upper slot of the rail-coupling bracket and the upper inclined slot of the upper adjustment carriage to cause an upper portion of the display-coupling bracket to move in a direction perpendicular to the first axis;
   a lower adjustment carriage positioned at the lower end portion of the rail-coupling bracket between the rail-coupling bracket and the display-coupling bracket, the lower adjustment carriage comprising:
      a back surface, a left surface, a right surface, and an lower surface, wherein the left surface of the lower adjustment carriage and the right surface of the lower adjustment carriage are received between the left surface of the rail-coupling bracket and the right surface of the rail-coupling bracket, and
      the left surface of the lower adjustment carriage and the right surface of the lower adjustment carriage each comprising a lower inclined slot, wherein at least a portion of the lower inclined slots is aligned with the lower slots of the rail-coupling bracket and the lower openings of the display-coupling bracket; and
   a lower adjustment knob, wherein the lower adjustment knob is a hand-turnable knob and a shaft extends from the hand-turnable knob of the lower adjustment knob along the first axis, the shaft of the lower adjustment knob extends through an opening on the lower surface of the rail-coupling bracket and is threadably engaged with a threaded aperture formed on the lower adjustment carriage, wherein the lower adjustment knob is configured to rotate to cause the lower adjustment carriage to move up and down along the first axis thereby causing the lower pin to travel along the lower slot of the rail-coupling bracket and the lower inclined slot of the upper adjustment carriage to cause a lower portion of the display-coupling bracket to move in a direction perpendicular to the first axis.

2. The adjustable connector of claim 1, wherein the upper inclined slots of the upper adjustment carriage are formed at a 45 degree angle with respect to the upper slots of the rail-coupling bracket and the first axis.

3. The adjustable connector of claim 1, wherein the lower inclined slots of the lower adjustment carriage are formed at a 45 degree angle with respect to the lower slots of the rail-coupling bracket and the first axis.

4. The adjustable connector of claim 1, wherein the upper inclined slots and the lower inclined slots are angled in opposite directions.

5. The adjustable connector of claim 1, wherein the upper adjustment knob and the lower adjustment knob are configured to rotate to provide at least 15 mm of displacement for the display-coupling bracket relative to the rail-coupling bracket.

6. The adjustable connector of claim 1, wherein the upper adjustment knob and the lower adjustment knob are configured to rotate to provide at least 1.5 degrees of tilt adjustment for the display-coupling bracket relative to the rail-coupling bracket.

7. The adjustable connector of claim 1, wherein a depth of the adjustable connector when fully retracted measured between the back surface of the rail-coupling bracket and the front surface of the display-coupling bracket is about 41 mm.

8. The adjustable connector of claim 1, wherein a width of the adjustable connector measured between the left and the right surfaces of the display-coupling bracket is about 41 mm.

9. The adjustable connector of claim 1, wherein the left and right surfaces of the upper adjustment carriage and the left and right surfaces of the lower adjustment carriage contact inner sides of the left and right surfaces of the rail-coupling bracket.

10. The adjustable connector of claim 1, wherein the left and right surfaces of display-coupling bracket contact outer sides of the left and right surfaces of the rail-coupling bracket.

11. The adjustable connector of claim 1, wherein the rail-coupling bracket, the display-coupling bracket, the upper adjustment carriage, and the lower adjustment carriage comprise steel.

12. The adjustable connector of claim 1, wherein of the upper adjustment knob and the lower adjustment knob comprise plastic.

13. The adjustable connector of claim 1, wherein the adjustable connector is configured for toolless adjustment.

14. A system, comprising:
a rail; and
a first adjustable connector comprising:
a rail-coupling bracket extending generally along a first axis between an upper end portion and a lower end portion, the rail-coupling bracket comprising:
a back surface, a left surface, and a right surface, which together define an opening configured to receive a rail, wherein each of the left surface and the right surface further comprise an upper horizontal slot on the upper end portion and a lower horizontal slot on the lower end portion, wherein the upper slots and the lower slots extend along a direction that is perpendicular to the first axis, and
an upper surface on the upper end portion and a lower surface on the lower end portion;
a display-coupling bracket generally extending along the first axis, the display-coupling bracket comprising:
a front surface comprising one or more openings for securing a display panel to the front surface of the display-coupling bracket, and
a left surface and a right surface, each projecting from lateral sides of the front surface in a direction towards the rail-coupling bracket, wherein the left surface of the display-coupling bracket and the right surface of the display-coupling bracket extend over outer sides of the left surface of the rail-coupling bracket and the right surface of the rail-coupling bracket, and wherein the left surface of the display-coupling bracket and the right surface of the display-coupling bracket each comprise an upper opening and a lower opening that are aligned with the upper slot and the lower slot of the rail-coupling bracket;
an upper adjustment carriage positioned at the upper end portion of the rail-coupling bracket between the rail-coupling bracket and the display-coupling bracket, the upper adjustment carriage comprising:
a back surface, a left surface, a right surface, and an upper surface, wherein the left surface of the upper adjustment carriage and the right surface of the upper adjustment carriage are received between the left surface of the rail-coupling bracket and the right surface of the rail-coupling bracket,
the left surface of the upper adjustment carriage and the right surface of the upper adjustment carriage each comprising an upper inclined slot, wherein at least a portion of the upper inclined slots is aligned with the upper slots of the rail-coupling bracket and the upper openings of the display-coupling bracket, and
an upper pin that extends through the upper openings of the display-coupling bracket, the upper inclined slots of the upper adjustment carriage, and the upper slots of the rail-coupling bracket;
an upper adjustment knob, wherein the upper adjustment knob is a hand-turnable knob and a shaft extends from the hand-turnable knob along the first axis, the shaft extends through an opening on the upper surface of the rail-coupling bracket and is threadably engaged with a threaded aperture formed on the upper adjustment carriage, wherein the upper adjustment knob is configured to rotate to cause the upper adjustment carriage to move up and down along the first axis thereby causing the upper pin to travel along the upper slot of the rail-coupling bracket and the upper inclined slot of the upper adjustment carriage to cause an upper portion of the display-coupling bracket to move in a direction perpendicular to the first axis;
a lower adjustment carriage positioned at the lower end portion of the rail-coupling bracket between the rail-coupling bracket and the display-coupling bracket, the lower adjustment carriage comprising:
a back surface, a left surface, a right surface, and an lower surface, wherein the left surface of the lower adjustment carriage and the right surface of the lower adjustment carriage are received between the left surface of the rail-coupling bracket and the right surface of the rail-coupling bracket, and
the left surface of the lower adjustment carriage and the right surface of the lower adjustment carriage each comprising a lower inclined slot, wherein at least a portion of the lower inclined slots is aligned with the lower slots of the rail-coupling bracket and the lower openings of the display-coupling bracket; and
a lower adjustment knob, wherein the lower adjustment knob is a hand-turnable knob and a shaft extends from the hand-turnable knob of the lower adjustment knob along the first axis, the shaft of the lower adjustment knob extends through an opening on the lower surface of the rail-coupling bracket and is threadably engaged with a threaded aperture formed on the lower adjustment carriage, wherein the lower adjustment knob is configured to rotate to cause the lower adjustment carriage to move up and down along the first axis thereby causing the lower pin to travel along the lower slot of the rail-coupling bracket and the lower inclined slot of the upper adjustment carriage to cause a lower portion of the display-coupling bracket to move in a direction perpendicular to the first axis.

15. The system of claim 14, further comprising a second adjustable connector comprising:
a rail-coupling bracket extending generally along a first axis between an upper end portion and a lower end portion, the rail-coupling bracket comprising:
a back surface, a left surface, and a right surface, which together define an opening configured to receive a rail, wherein each of the left surface and the right surface further comprise an upper horizontal slot on the upper end portion and a lower horizontal slot on the lower end portion, wherein the upper slots and the lower slots extend along a direction that is perpendicular to the first axis, and
an upper surface on the upper end portion and a lower surface on the lower end portion;
a display-coupling bracket generally extending along the first axis, the display-coupling bracket comprising:
a front surface comprising one or more openings for securing a display panel to the front surface of the display-coupling bracket, and
a left surface and a right surface, each projecting from lateral sides of the front surface in a direction towards the rail-coupling bracket, wherein the left surface of the display-coupling bracket and the right surface of the display-coupling bracket extend over outer sides of the left surface of the rail-coupling bracket and the right surface of the rail-coupling bracket, and wherein the left surface of the display-coupling bracket and the right surface of the display-coupling bracket each comprise an upper opening and a lower opening that are aligned with the upper slot and the lower slot of the rail-coupling bracket;
an upper adjustment carriage positioned at the upper end portion of the rail-coupling bracket between the rail-coupling bracket and the display-coupling bracket, the upper adjustment carriage comprising:
a back surface, a left surface, a right surface, and an upper surface, wherein the left surface of the upper adjustment carriage and the right surface of the upper adjustment carriage are received between the left surface of the rail-coupling bracket and the right surface of the rail-coupling bracket,
the left surface of the upper adjustment carriage and the right surface of the upper adjustment carriage each comprising an upper inclined slot, wherein at least a portion of the upper inclined slots is aligned with the upper slots of the rail-coupling bracket and the upper openings of the display-coupling bracket, and
an upper pin that extends through the upper openings of the display-coupling bracket, the upper inclined slots of the upper adjustment carriage, and the upper slots of the rail-coupling bracket;
an upper adjustment knob, wherein the upper adjustment knob is a hand-turnable knob and a shaft extends from the hand-turnable knob along the first axis, the shaft extends through an opening on the upper surface of the rail-coupling bracket and is threadably engaged with a threaded aperture formed on the upper adjustment carriage, wherein the upper adjustment knob is configured to rotate to cause the upper adjustment carriage to move up and down along the first axis thereby causing the upper pin to travel along the upper slot of the rail-coupling bracket and the upper inclined slot of the upper adjustment carriage to cause an upper portion of the display-coupling bracket to move in a direction perpendicular to the first axis;
a lower adjustment carriage positioned at the lower end portion of the rail-coupling bracket between the rail-coupling bracket and the display-coupling bracket, the lower adjustment carriage comprising:
a back surface, a left surface, a right surface, and an lower surface, wherein the left surface of the lower adjustment carriage and the right surface of the lower adjustment carriage are received between the left surface of the rail-coupling bracket and the right surface of the rail-coupling bracket, and
the left surface of the lower adjustment carriage and the right surface of the lower adjustment carriage each comprising a lower inclined slot, wherein at least a portion of the lower inclined slots is aligned with the lower slots of the rail-coupling bracket and the lower openings of the display-coupling bracket; and
a lower adjustment knob, wherein the lower adjustment knob is a hand-turnable knob and a shaft extends from the hand-turnable knob of the lower adjustment knob along the first axis, the shaft of the lower adjustment knob extends through an opening on the lower surface of the rail-coupling bracket and is threadably engaged with a threaded aperture formed on the lower adjustment carriage, wherein the lower adjustment knob is configured to rotate to cause the lower adjustment carriage to move up and down along the first axis thereby causing the lower pin to travel along the lower slot of the rail-coupling bracket and the lower inclined slot of the upper adjustment carriage to cause a lower portion of the display-coupling bracket to move in a direction perpendicular to the first axis.

16. The system of claim 14, wherein the rail comprises a slotted rail.

17. The system of claim 14, wherein the first adjustable connector comprises a locking tab for securing the first adjustable connector to the rail.

18. The system of claim 14, wherein the upper adjustment knob and the lower adjustment knob are configured to provide at least 15 mm of displacement for the display-coupling bracket relative to the rail-coupling bracket.

19. The system of claim 14, wherein the upper adjustment knob and the lower adjustment knob are configured to provide at least 1.5 degrees of tilt adjustment for the display-coupling bracket relative to the rail-coupling bracket.

20. The system of claim 14, wherein a depth of the adjustable connector when fully retracted measured between the back surface of the rail-coupling bracket and the front surface of the display-coupling bracket is about 41 mm.

* * * * *